(12) United States Patent
Böning et al.

(10) Patent No.: US 8,794,917 B2
(45) Date of Patent: Aug. 5, 2014

(54) TURBOCHARGER WITH A BEARING ARRANGEMENT FOR MOUNTING A ROTOR SHAFT

(75) Inventors: Ralf Böning, Reiffelbach (DE); Hartmut Claus, Grünstadt (DE); Dirk Frankenstein, Flörsheim-Dalsheim (DE); Holger Fäth, Fußgönheim (DE); Jochen Held, Bolanden-Weierhof (DE); Stefan Krauß, Grünstadt (DE); Stefan Nowack, Kirchheimbolanden (DE)

(73) Assignee: Continental Automotive GmbH, Hannover (DE)

( * ) Notice: Subject to any disclaimer, the term of this patent is extended or adjusted under 35 U.S.C. 154(b) by 649 days.

(21) Appl. No.: 13/120,985

(22) PCT Filed: Sep. 21, 2009

(86) PCT No.: PCT/EP2009/062167
§ 371 (c)(1),
(2), (4) Date: May 31, 2011

(87) PCT Pub. No.: WO2010/034677
PCT Pub. Date: Apr. 1, 2010

(65) Prior Publication Data
US 2011/0223011 A1    Sep. 15, 2011

(30) Foreign Application Priority Data
Sep. 25, 2008 (DE) .................. 10 2008 048 861

(51) Int. Cl.
*F01D 25/16* (2006.01)
(52) U.S. Cl.
USPC .......................................... 415/229

(58) Field of Classification Search
CPC ...... F04D 29/059; F01D 25/16; F01D 25/164
USPC .................. 416/244 A, 174; 415/229, 170.1; 417/407
See application file for complete search history.

(56) References Cited

U.S. PATENT DOCUMENTS

| | | | |
|---|---|---|---|
| 4,046,430 A | 9/1977 | Buono et al. | |
| 4,601,591 A * | 7/1986 | Wright | 384/536 |
| 4,772,135 A | 9/1988 | Griguscheit | |
| 4,789,253 A | 12/1988 | Perego | |
| 4,808,091 A * | 2/1989 | Ruetz | 417/407 |
| 4,997,290 A * | 3/1991 | Aida | 384/99 |
| 5,055,009 A * | 10/1991 | Gutknecht | 417/407 |
| 6,039,322 A | 3/2000 | Stadler | |
| 6,250,897 B1 * | 6/2001 | Thompson et al. | 417/407 |

FOREIGN PATENT DOCUMENTS

| | | |
|---|---|---|
| DE | 1077007 B | 3/1960 |
| DE | 2042247 A1 | 3/1972 |
| DE | 3628687 A1 | 2/1988 |
| DE | 4138609 A1 | 5/1993 |
| GB | 2200696 A | 8/1988 |

* cited by examiner

*Primary Examiner* — Nathaniel Wiehe
*Assistant Examiner* — Kayla McCaffrey
(74) *Attorney, Agent, or Firm* — Laurence A. Greenberg; Werner H. Stemer; Ralph E. Locher

(57) ABSTRACT

A turbocharger, which is particularly suitable for a motor vehicle, includes: a rotor shaft with a turbine impeller and a compressor impeller disposed thereon. The rotor shaft has a roller bearing assembly for mounting in the housing of the turbocharger.

16 Claims, 2 Drawing Sheets

TURBOCHARGER WITH A BEARING ARRANGEMENT FOR MOUNTING A ROTOR SHAFT

BACKGROUND OF THE INVENTION

Field of the Invention

The invention refers to a turbocharger, especially for a motor vehicle, with a bearing arrangement for supporting a rotor shaft, wherein a turbine wheel and a compressor impeller of the turbocharger are arranged on the shaft.

In general, turbochargers serve for increasing the power of an internal combustion engine or to enable a reduction in size of the internal combustion engine with the same power. The turbocharger in this case utilizes the energy of the exhaust gas to drive its turbine and in turn to drive the compressor via the turbine for compressing fresh air. The compressed air is then fed to the engine. As a result, more air is directed into the combustion chamber of the engine, wherein at the same time more fuel can be apportioned to the combustion. As a result of this, the torque of the engine can be increased.

In a turbocharger, the rotor shaft up to now has been supported by means of an oil-lubricated plain bearing arrangement. Such oil-lubricated bearing assemblies, however, have various disadvantages. Thus, the entry of soot particles of the exhaust gas into the lubricating oil leads to quicker ageing of the lubricating oil. Furthermore, problems can occur when starting the engine since the oil film is not yet sufficient to ensure a suitable lubrication of the bearings.

BRIEF SUMMARY OF THE INVENTION

It is therefore the object of the present invention to provide a turbocharger with an improved bearing arrangement, in which oil as lubricant can essentially be dispensed with.

This object is achieved by means of a turbocharger with the features of the claims.

Consequently, according to the invention a turbocharger, especially for a motor vehicle, is provided with:
  a rotor shaft on which are arranged a turbine wheel and a compressor impeller,
  wherein the rotor shaft has a rolling bearing arrangement for support in the casing of the turbocharger.

Such a turbocharger has the advantage that the rolling bearing arrangement does not require costly oil lubrication, in which large quantities of oil are fed in a directed manner to the bearing points. Oil which is fed serves primarily for cooling the rolling bearing of the turbine side and is required in a smaller quantity compared with the plain bearing assembly. Furthermore, in the case of the rolling bearing assemblies no problems occur during engine start, as is the case with oil-lubricated bearing assemblies.

Advantageous developments and further developments of the invention are gathered from the dependent claims and also from the description with reference to the drawings.

According to one embodiment according to the invention, the rotor shaft can be supported in the radial direction and at the same time in the axial direction via the rolling bearing arrangement, wherein the rolling bearing arrangement has for example two bearing units with rolling elements. Such a rolling bearing assembly of the rotor shaft has the advantage that no run-up difficulties occur during engine start when the shaft is set in rotation. Furthermore, only minor friction occurs. A bearing unit in this case can be constructed as a single-row or double-row rolling bearing, for example, depending upon function and intended application.

In a further embodiment according to the invention, the rolling bearing arrangement is provided with an additional damping device. The damping device has the advantage that noise, for example, which can arise as a result of the rolling of the rolling elements of a rolling bearing, can be damped.

This is particularly relevant from a vehicle-acoustic point of view.

In another embodiment according to the invention, the damping device has at least one or more damping coating(s) which for example can be provided in various places of the rolling bearing arrangement. Thus, one damping coating can be provided on the outer side of an outer race of a rolling bearing arrangement, for example, and a second damping coating can be provided on the outer side of an additional sleeve element in which the rolling bearing arrangement is provided. The damping coatings can consist of a rubber material, for example, or may at least feature this, wherein the rubber material is a hard rubber material, for example. Such a rubber material can be simply processed and is comparatively inexpensive.

In a further embodiment according to the invention, at least one or more of the bearing unit(s) has, or have, a separate outer race and a separate inner race, with rolling elements arranged in between. Such bearing units have the advantage that they are a current form of rolling bearings which are simple to install and cost-effective to produce. For establishing a bearing spacing between the bearing units, provision can be made in this case for a distance sleeve, for example.

According to another embodiment according to the invention, at least one or more of the bearing unit(s) has, or have, a separate outer race and an inner race which is formed or integrated in the respective shaft, with rolling elements arranged in between.

In a further embodiment according to the invention, an outer race and/or an inner race of at least one or more of the bearing unit(s) can be provided with a damping coating on the outer side thereof. The damping coating in this case can be applied to the respective race by means of extrusion coating or overmolding, for example. This has the advantage that a sleeve element or a bearing housing wall, for example, in which the respective coated bearing units are arranged, does not have to be provided with a damping coating itself. Instead of this, the damped or coated bearing units can be directly installed. Alternatively, provision can also be made for an undamped or uncoated bearing unit which is installed in a sleeve element or a bearing housing wall, for example, with a damping coating.

In a further embodiment according to the invention, provision can be made for a sleeve element in which at least one or more bearing unit(s) can be accommodated. The sleeve element in this case can have a damping coating on its inner side and/or on its outer side, for example. If, for example, the sleeve element is provided with a damping coating only on its inner side, then it may be formed as a fitted bush which creates a pressed connection, for example, with the bearing housing.

In a further embodiment according to the invention, the damping coating can be provided for example over the entire surface of the sleeve element or of the corresponding bearing housing wall. Alternatively, the damping coating can be provided there only in at least one, two, three or more section(s).

According to a further embodiment according to the invention, provision can be made for a combination consisting of at least two sleeve elements, wherein a damping coating is provided between the two sleeve elements. In this way, the bearing units can be installed for example directly in the inner sleeve element even without an additional damping coating. The outer sleeve element can also be installed for example in the bearing housing without an additional damping coating on the outer side. Nevertheless, damping can be achieved as a result of the damping coating between the two sleeve elements.

In a further embodiment according to the invention, a damping coating and/or a spring element can be provided between two outer races in each case of two bearing units. This has the advantage that forces, for example, which occur in the axial direction, can also be damped.

In another embodiment according to the invention, the damping device or the damping coating can be adjustable with regard to elasticity or hardness, for example. In this case, the respective damping coating can have the same hardness or elasticity over its entire surface, for example, or it can vary. This has the advantage that the damping characteristic of the damping coating can be adjusted in a specific manner, depending upon function or intended application.

In a further embodiment according to the invention, the damping coating has one, two, three, four or more damping layer(s). In this case, at least two or all of the damping layers can be formed identically or differently, for example with regard to thickness, elasticity, hardness and/or material. In this way, the damping characteristic can also be adjusted and adapted in a specific manner, depending upon function and intended application.

The invention is subsequently explained in more detail based on the exemplary embodiments which are represented in the schematic figures of the drawings. In the drawing:

BRIEF DESCRIPTION OF THE SEVERAL VIEWS OF THE DRAWING

In all the figures, the same or functionally the same elements and devices—unless otherwise indicated—have been provided with the same designations.

DESCRIPTION OF THE INVENTION

Figure 1:
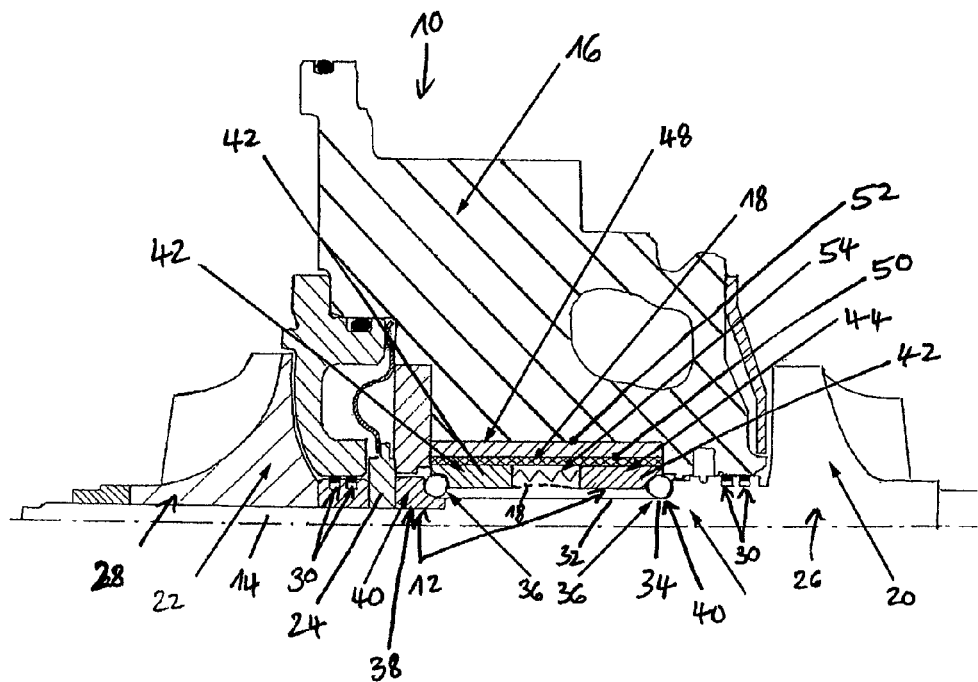
FIG. 1 shows a sectional view through a casing of a turbocharger with a bearing arrangement for supporting the rotor shaft according to a first embodiment of the invention.

In FIG. 1, a first embodiment of the turbocharger 10 according to the invention is shown. According to the invention, the turbocharger 10 in this case has an oil-free bearing arrangement 12 in the form of a rolling bearing arrangement for supporting a rotor shaft 14 of the turbocharger 10 in the radial and/or axial direction. Such an oil-free bearing arrangement 12, compared with the oil-lubricated bearing assemblies which are known from the prior art, has the advantage that an oil feed and discharge in the bearing housing 16 of the turbocharger 10 can be dispensed with. Furthermore, with a rolling bearing assembly no run-up difficulties occur during engine start.

Since rolling bearings generally form a type of bearing assembly which essentially has no or hardly any damping properties, the rolling bearing arrangement according to the invention is additionally provided with a damping facility or damping device 18. Such an additional damping facility 18, from the vehicle-acoustic point of view, has the advantage that by means of this additional damping facility 18 structure-borne sound, for example, from the structures of the vehicle, which can be created as a result of residual unbalance of the rotating components and the rolling of the rolling elements, for example, can be kept away.

The first embodiment of the turbocharger 10 according to the invention is shown in FIG. 1 in a partial sectional view. The turbocharger 10 in this case has a rotor shaft 14 on which are arranged a turbine wheel 20 and a compressor impeller 22. The rotor shaft 14 in this case is supported in the bearing housing 16 of the turbocharger 10 via a rolling bearing arrangement 12, for example, in the radial and axial directions. Provision can be made in this case for an additional oil wiper ring 24, for example, adjacent to the rolling bearing arrangement 12. Furthermore, the bearing housing 16 is sealed in relation to the turbine 26 and to the compressor 28. For this purpose, provision can be made for corresponding piston ring seals 30, for example. The sealing of the bearing housing 26 is shown purely by way of example in FIG. 1, and the invention is not limited to this special embodiment.

For supporting the rotor shaft 14, the rotor shaft 14 is provided with a step 32, for example, which forms a seat 34 for the respective rolling elements 36 of a first bearing unit 38. The rolling elements 36 of the first bearing unit 38 in this case are retained on the inner side in the seat 34 of the rotor shaft 14, the seat functioning as a type of inner race element 40, and on the outer side the rolling elements are retained by means of an outer race element 42 of the bearing unit 38. Furthermore, provision is made for a second bearing unit 44. The second bearing unit 44 in this case has an inner race element 40 which is pushed onto a step of the rotor shaft 14 with an outer race element 42, wherein the rolling elements 36 of the second bearing unit 44 are arranged between the inner race element 40 and the outer race element 42. Spherical rolling elements 36, for example, are used as rolling elements 36 in the two bearing units 38, 44. In principle, however, any other type of rolling element can also be used, starting with conical rolling elements, cylindrical rolling elements, etc. Furthermore, the rolling bearings or the types of rolling bearing can be identical or different in both bearing units 38, 44, depending upon function and intended application. Furthermore, only one of the bearing units 38, 44 may be provided as a rolling bearing assembly and the other bearing unit provided in the form of another oil-free bearing unit, for example as a magnetic bearing assembly or an air bearing assembly. Such magnetic bearing assemblies are described in DE 10 2008 014 684.6 and DE 10 2008 035 086.9, for example. The previously rendered constructions apply to all the embodiments. The first and/or second bearing unit 38, 44 can be formed for example as angular contact shoulder bearings, angular contact rolling bearings and/or deep groove ball bearings. This applies to all the embodiments of the invention. Such constructional forms have the advantage that they can absorb both radial and axial forces. In principle, however, all other constructional forms of rolling bearings are also possible. The invention is not limited to the previously stated constructional forms. Provision can also be made for radial and/or axial rolling bearings. This also applies to all the embodiments of the invention.

According to the first embodiment according to the invention, an elastic damping coating 18 is arranged around the actual rolling bearing 12. In the case as is shown in FIG. 1, the two bearing units 38, 44 are provided with a sleeve element 48 or a bush, wherein a damping coating 18 is arranged on the inner side 50 of the sleeve element 48. This damping coating 18 can be suitably adapted, in hardness and elasticity, for example, in order to establish a desired damping. The damping coating 18 can consist of an elastic material, for example a rubber material or elastomer, or this can at least feature rubber or hard rubber, for example. The damping coating 18 in this case is for example also correspondingly thermally resistant or heat resistant in its selection, i.e. in other words suitable for the temperatures in this region of the turbocharger. This also applies to all the embodiments of the invention.

The damping coating 18 in this case can generally be provided on the inner side 50 of the sleeve element 48, as is shown in FIG. 1, and can form a type of bush. The rolling bearings 12 or the bearing units 38, 44 in this case can be installed directly in this bush which is formed by means of the damping material 18 or the damping coating 18, as is shown in FIG. 1. Alternatively, the damping coating 18 can be provided just in the region of the bearing unit (not shown), for example. A damping coating 18 can optionally also be additionally or alternatively arranged on the outer side 52 of the sleeve element 48. The damping coating 18 in this case can also be arranged continuously along the entire sleeve element 48 or arranged in sections of the sleeve element 48.

In the exemplary embodiment as is shown in FIG. 1, a spring element arrangement 54 can optionally additionally be arranged between the two outer bearing race elements 42. The spring element 54 in FIG. 1 in this case can act in the axial direction as an additional damping device 18 between the two outer bearing race elements 42 of the bearing units 38, 44. Via the spring element 54, the first and second bearing units 38, 44 can be mutually tensioned.

Instead of the spring element arrangement 54, provision can also be made for an additional damping coating 18, for example, as is indicated in FIG. 1 by a broken line, and this can be fixed on the first damping coating 18, for example, by means of an adhesive, etc., for example. Alternatively, the damping coating 18 can be formed on the inner side 50 of the sleeve element 48, also with a corresponding projection which is formed in an encompassing or at least partially encompassing manner, for example. In this way, the damping coating 18 can also absorb axial forces and can mutually tension the two bearing units 38, 44, for example. In principle, the spring element arrangement can also be embedded, for example, into the damping coating 18. The previously rendered constructions also apply to all the embodiments of the invention.

The remaining configuration of the turbocharger unit 10, like the previously described seal 30, the thrust-bearing disk 24, etc., is shown in FIG. 1 purely by way of example in a greatly simplified manner, and can be optionally varied. The invention is not limited to this specific configuration. This also applies to all the embodiments.

Figure 2:
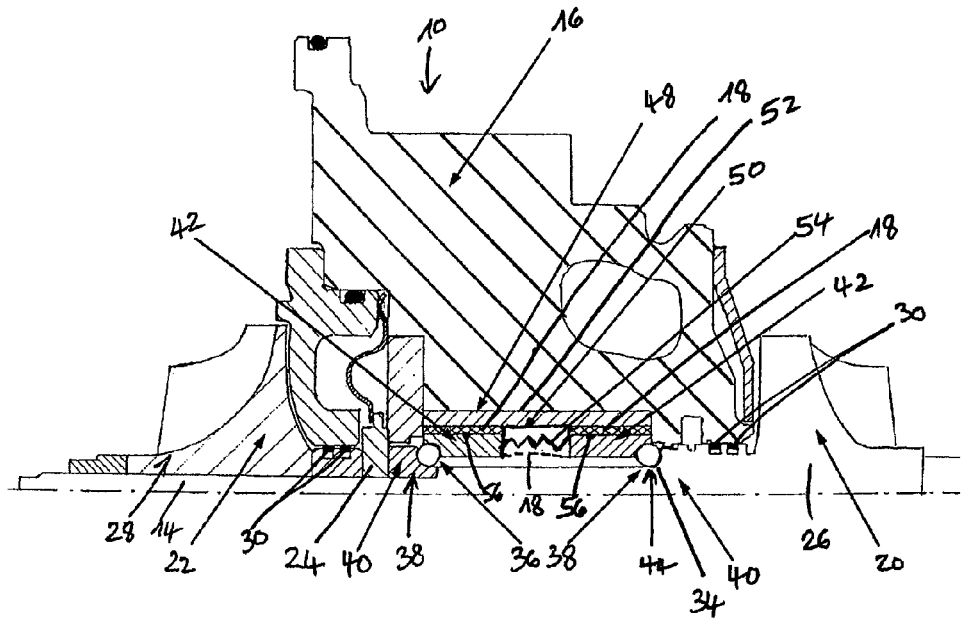
FIG. 2 shows a sectional view through a casing of a turbocharger with a bearing arrangement according to a second embodiment of the invention.

In FIG. 2, a second embodiment according to the invention of the turbocharger 10 is furthermore shown. The second embodiment in this case differs from the first embodiment by the fact that the respective rolling bearing 12 or the bearing unit 38, 44 can also be designed as a type of cartridge to which is applied the damping material 18 by overmolding or extrusion coating, for example. In other words, the outer side 56 of the outer race element 42 of the respective bearing unit 38, 44 is provided with a damping material 18 or a damping coating 18. The bearing units 38, 44 can then be fitted into the sleeve element 48, for example. Furthermore, a fitted bush, for example, can be provided as the sleeve element 48, enabling a pressed connection of the cartridge in the turbocharger casing or in its bearing housing 16.

Figure 3:
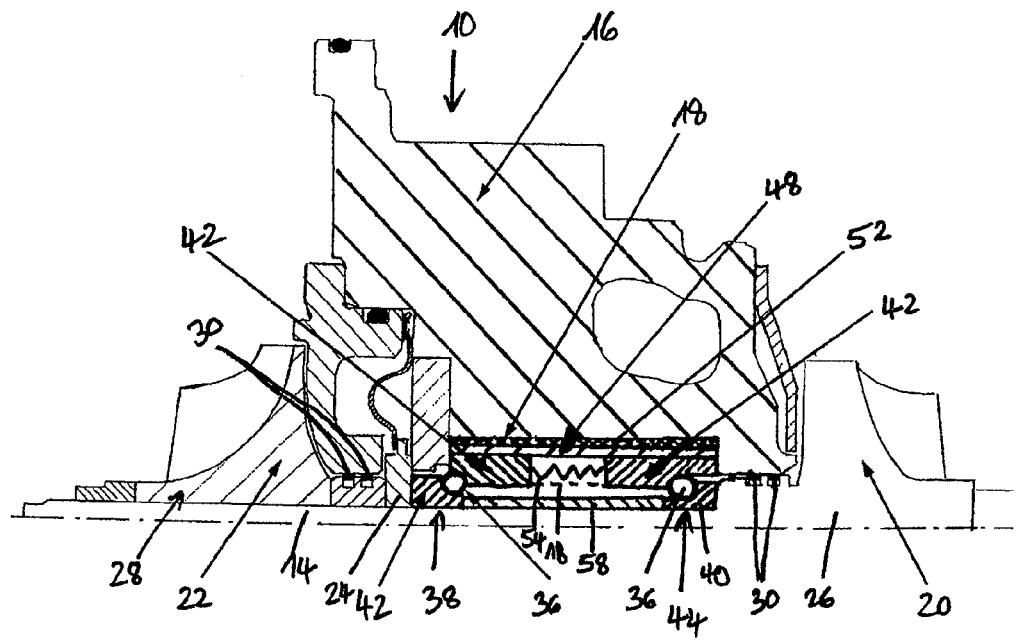
FIG. 3 shows a sectional view through a casing of a turbocharger with a bearing arrangement according to a third embodiment according to the invention.

In FIG. 3, a third embodiment according to the invention is now shown. In this case, the turbocharger 10 according to the third embodiment is also shown in a partial sectional view.

In the case of the third embodiment according to the invention, provision is also made for two bearing units 38, 44, for example. The two bearing units 38, 44 in each case have an inner race element 40 and an outer race element 42, between which are arranged the respective rolling elements 36. The rolling elements 36 in this case are spherical, but can also be cylindrical, conical, etc., depending upon function and intended application. In the present case, as is shown in FIG. 3, a distance sleeve 58 is provided between the two bearing units 38, 44, or in this case between their inner race elements 40, in order to establish the bearing spacing. In the case of the first embodiment, such a distance sleeve 58 is not absolutely necessary since in this case the bearing spacing can be established by means of the length of the step 32 of the rotor shaft 14.

Furthermore, the two bearing units 38, 44 are arranged in a sleeve element 48. In this case, a spring element arrangement 54 can optionally additionally be provided between the two outer race elements 42 of the bearing units 38, 44 in order to absorb and to damp forces in the axial direction. Instead of the spring element arrangement 54, a damping coating 18 can be arranged between the two outer race elements 42, as is shown in FIG. 3 by the broken line.

Furthermore, in the case of the third embodiment according to the invention, a damping coating 18 is provided on the outer side 52 of the sleeve element 48. The damping coating 18 in this case can be provided over the entire outer surface or over the entire length of the sleeve element 48, as is shown in FIG. 3, or in one or more section(s) on the outer side 52 of the sleeve element (not shown). In principle, a damping coating 18 can also be additionally or alternatively arranged on the inner side 50 of the sleeve element 48, and in this case extend for example over the entire inner surface of the sleeve element 48, as is shown in FIG. 1, or extend only in the section of the bearing units 38, 44 and/or between them.

The damping coating 18, as in the case of the two other embodiments, consists of an elastic or damping material, for example a rubber material, such as rubber or hard rubber, etc. The invention, however, is not limited to rubber materials.

Provision can also be made for example for foam materials or nonwoven fabric materials or combinations of materials, to name only a few examples, which are suitably thermally or heat resistant and which are suitably elastic in order to damp out forces which occur.

Figure 4:
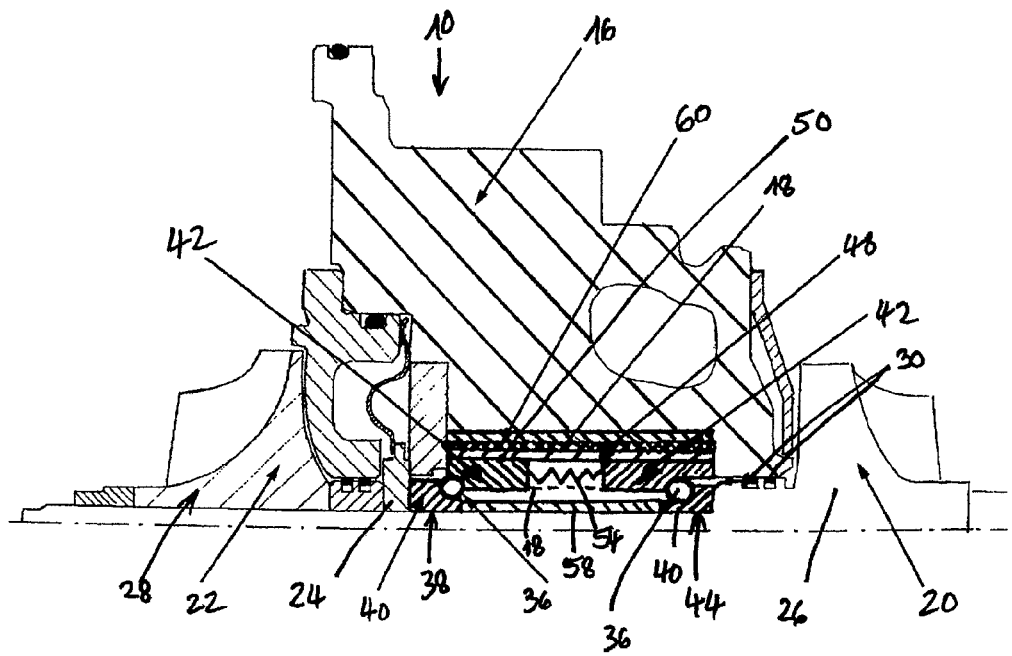
FIG. 4 shows a sectional view through a casing of a turbocharger with a bearing arrangement according to a fourth embodiment according to the invention.

Furthermore, a fourth embodiment according to the invention of a turbocharger 10 is shown in FIG. 4 in a partial sectional view. The fourth embodiment is essentially based on the third embodiment. In the case of the fourth embodiment, however, a double sleeve element with a damping coating 18 is provided between the first and second sleeve elements 48, 60. A further damping coating 18 can optionally be provided on the outer side of the double sleeve element 48, 60 and/or a further damping coating 18 on the inner side of the double sleeve element (not shown). In a further variant, one or both bearing units 38, 44 can also additionally be provided with a damping coating 18 on their outer race elements 42 and/or inner race elements 40, as is shown in the second embodiment according to FIG. 2.

In the case of the fourth embodiment, as is shown in FIG. 4, provision is made for a distance sleeve 58 between the two inner bearing race elements 40 of the bearing units 38, 44 for establishing the bearing spacing. Instead of this, in the case of the third and fourth embodiments the rotor shaft 14 can also be provided with a step 32 which on the one hand forms a seat 34 for the rolling elements 36 of the outer bearing unit 44, for example, and on the other hand at the same time establishes the bearing spacing, for example. Furthermore, a spring element arrangement 54 or a damping coating 18 can additionally be provided between the two outer race elements 42 of the bearing units 38, 44, as in the other embodiments, which can absorb and damp axial forces. The additional damping coating 18 in this case is indicated in FIG. 4 by a broken line.

As a result of the specific introduction of additional damping 18 in the rolling bearing assembly 12, a wide-scale application in road traffic with regard to noise emissions required by the customers is especially possible. As a result, the physical advantages of this type of bearing assembly, such as improved response behavior during engine start, for example, and a lower friction capacity, can be of benefit to the end customers without loss of comfort. This applies to all the embodiments of the invention.

The damping coating 18 previously described in the embodiments can consist of one, two, three, four or more damping material layer(s), wherein the respective damping material layers in each case have the same thickness, hardness, elasticity and/or the same material. Alternatively, individual, i.e. at least two or more, or all of the damping material layers can differ with regard to thickness, hardness, elasticity and/or material. Furthermore, the damping coating which is provided on the respective sleeve element, or sleeve elements, and/or on the bearing units, can be identical over the entire surface or can vary in sections, for example, in order to create regions or sections of different hardness, thickness and/or elasticity, for example, depending upon function and intended application. As damping material, in this case rubber, such as hard rubber, natural rubber, etc., can be used. This also applies to all the embodiments of the invention.

Although the present invention has been described based on preferred exemplary embodiments, it is not limited to them, but can be modified in multifarious ways. The aforesaid embodiments can be combined with each other, especially individual features thereof.

Thus, for example in the case of the first to third embodiments, a double sleeve element 48, 60 or a multiple sleeve element can be used, with corresponding damping coatings 18 in between. Furthermore, in the case of the first, second and fourth embodiments, a damping coating 18 can also be provided on the outer side of the sleeve element 48, as in the case of the third embodiment. In this case, there may optionally be no provision for an additional damping coating 18 on the inner side of the sleeve element 48 and on the outer bearing race elements 42 of the bearing units 38, 44, as in the case of the third embodiment. Furthermore, a continuous damping coating 18 can be provided between the inner side of the sleeve element and the outer race elements of the bearing units 38, 44 in the case of the second to fourth embodiments, comparable to the first embodiment. Furthermore, in the case of the first, third and fourth embodiments, a damping coating 18 may be provided only in the region of the outer race elements 42 of the bearing units 38, 44, as in the case of the second embodiment. Furthermore, the bearing assembly 12 of the first and second embodiments can be realized according to the third and fourth embodiments, and vice versa.

In the case of the embodiments previously described with reference to FIGS. 1-4, the respective bearing unit 38, 44 is arranged in a sleeve element 48 or in a sleeve element combination 48, 60 (FIG. 4). In principle, the sleeve element 48 or the sleeve element combination 48, 60 in the embodiments can even be omitted and the bearing units 38, 44 with their outer race elements 42 and the damping coating 18, or damping coatings 18, can be installed directly in the bearing housing 16 instead. In this case, provision may be made for a continuous damping coating 18, or for a damping coating only in the region of the bearing units 38, 44 between the bearing housing wall 16 and the respective bearing unit 38, 44. In this case, a damping coating 18 and/or a spring element arrangement 54 can optionally additionally also be provided between the outer race elements 42 of two bearing units 38, 44, as is comparably shown in FIGS. 1-4.

Furthermore, the rolling bearing arrangement for supporting the rotor shaft 14, in addition to a combined rolling bearing arrangement 38, 44 which acts both as a radial bearing and as a thrust bearing, as was previously described with reference to FIGS. 1-4, additionally or alternatively to this can also have a separate, i.e. a purely axial and a purely radial, rolling bearing arrangement (not shown). Such independent radial or axial rolling bearing arrangements are generally known from the prior art. In this case, they also have an outer race or an outer race element and an inner race or an inner race element, with rolling elements arranged in between. In this case, a damping coating can also now be provided on the outer side of the outer race and/or of the inner race, as in the case of the bearing units in FIG. 4, for example. The rotor shaft can be supported via a radial rolling bearing arrangement, for example, and as a thrust bearing can have at least one thrust bearing disk or a thrust rolling bearing, for example. Also, the rotor shaft can be supported via a conventional radial bearing assembly and have a thrust rolling bearing. Different combinations for supporting the rotor shaft are possible. According to the invention, however, at least one rolling bearing is always used for supporting the rotor shaft. This, as previously described, can be a combined rolling bearing or a purely thrust or radial rolling bearing. The rolling bearings in this case can be combined with any other bearing types, preferably also oil-free bearing assemblies. This, however, is not compulsory.

In the previously described embodiments, a spring element 54, for example, or a damping coating 18 is arranged between the outer race elements 42. However, a distance sleeve, for example, can also be arranged between the outer race elements 42, instead of between the inner race elements, for example. In this case, a spring element and/or a damping coating can optionally additionally be provided between the race element of the bearing and the distance sleeve. However, there may be, for example, no arrangement for an object between the outer race elements, i.e. no spring element, no damping coating, no distance sleeve.

The invention claimed is:

1. A turbocharger, comprising:
a casing;
a rotor shaft carrying a turbine wheel and a compressor impeller;
a rolling bearing assembly disposed to support said rotor shaft in said casing of the turbocharger, said rolling bearing assembly including two bearing units, each of said two bearing units including: a separate outer race element, an inner race element selected from the group consisting of a separate race element and a race element formed on or integrated in said rotor shaft, and a plurality of rolling elements disposed in between said outer and inner race elements; and
a damping device for said rolling bearing assembly;
said damping device including a damping coating, wherein at least one element selected from the group consisting of said outer race element and inner race element has an outer side with said damping coating formed thereon; and
said damping device also including an additional damping coating and a spring element being disposed between two of said outer race elements and/or between two of said inner race elements of the two said bearing units.

2. The turbocharger according to claim 1, wherein said rolling bearing assembly is a support bearing of said rotor shaft.

3. The turbocharger according to claim 1, wherein said rolling bearing assembly is a combined rolling bearing assembly with said two bearing units supporting said rotor shaft in an axial direction and a radial direction, respectively.

4. The turbocharger according to claim 1, wherein said two bearing units of said rolling bearing assembly are configured to support said rotor shaft in an axial direction or in a radial direction.

5. The turbocharger according to claim 1, wherein said damping coating and said additional damping coating each include a rubber material or an elastomer.

6. The turbocharger according to claim 1, wherein said damping coating is an extrusion coating or an overmolding coating.

7. The turbocharger according to claim 1, wherein said rolling bearing assembly includes at least one bearing unit formed with a sleeve element in which one or more of said bearing units are accommodated.

8. The turbocharger according to claim 7, which comprises a damping coating provided on one or both of an outer side and an inner side of said sleeve element, and wherein said damping coating is provided on an entire surface of said sleeve element or in one, two, three, or more sections of said sleeve element.

9. The turbocharger according to claim 7, which comprises a damping coating formed on an inner side of said sleeve element, in a region of a respective said bearing unit.

10. The turbocharger according to claim 7, wherein said sleeve element is one of a composite of two sleeve elements including a first sleeve element and at least one second sleeve element, wherein a damping coating is provided between said first and second sleeve elements.

11. The turbocharger according to claim 10, further comprising a damping coating on one or both of an outer side or an inner side of the composite of said two sleeve elements.

12. The turbocharger according to claim 1, wherein said rolling bearing assembly includes at least two bearing units each with an outer race element, an inner race element, and at least one element selected from the group consisting of a damping coating, a spring element, and a distance sleeve disposed between two said outer race elements and/or between two said inner race elements of two said bearing units.

13. The turbocharger according to claim 1, wherein said damping device is adjustable with regard to at least one of an elasticity or a hardness thereof.

14. The turbocharger according to claim 1, wherein said damping a coating is formed with one or a plurality of coating layers, and wherein at least two of said coating layers are identical or different with regard to a property thereof selected from the group consisting of a thickness, an elasticity, a hardness, and a material.

15. The turbocharger according to claim 1, wherein at least one of said bearing units is a bearing unit selected from the group consisting of an angular contact shoulder bearing, an angular contact rolling bearing, and a deep groove ball bearing.

16. The turbocharger according to claim 1 configured as a turbocharger for a motor vehicle.

* * * * *